United States Patent
Lee et al.

(10) Patent No.: US 8,610,852 B2
(45) Date of Patent: Dec. 17, 2013

(54) PATTERNED RETARDATION FILM AND METHOD FOR MANUFACTURING THE SAME

(75) Inventors: Dae-Hee Lee, Daejeon (KR); Sin-Young Kim, Daejeon (KR); Moon-Soo Park, Daejeon (KR)

(73) Assignee: LG Chem, Ltd., Seoul (KR)

( * ) Notice: Subject to any disclaimer, the term of this patent is extended or adjusted under 35 U.S.C. 154(b) by 34 days.

(21) Appl. No.: 13/168,695

(22) Filed: Jun. 24, 2011

(65) Prior Publication Data

US 2011/0317084 A1    Dec. 29, 2011

Related U.S. Application Data

(63) Continuation of application No. PCT/KR2010/007055, filed on Oct. 14, 2010.

(30) Foreign Application Priority Data

Oct. 19, 2009 (KR) .......................... 10-2009-0099358
Oct. 13, 2010 (KR) .......................... 10-2010-0099695

(51) Int. Cl.
*G02F 1/1335* (2006.01)
*G02F 1/1337* (2006.01)

(52) U.S. Cl.
USPC ................ 349/117; 349/15; 349/96; 349/126

(58) Field of Classification Search
USPC .............................. 349/117, 15, 96, 125, 126
See application file for complete search history.

(56) References Cited

U.S. PATENT DOCUMENTS

| | | | |
|---|---|---|---|
| 5,953,091 A * | 9/1999 | Jones et al. ................... | 349/129 |
| 2004/0032547 A1* | 2/2004 | Yano et al. ...................... | 349/96 |
| 2007/0076153 A1* | 4/2007 | Kashima ....................... | 349/117 |
| 2008/0055521 A1* | 3/2008 | Mizutani et al. ................ | 349/96 |

FOREIGN PATENT DOCUMENTS

| | | |
|---|---|---|
| EP | 1227347 | 7/2002 |
| EP | 1559745 | 8/2005 |
| JP | 08-334618 A | 12/1996 |
| JP | 2005-173547 | 6/2005 |
| KR | 10-2000-0033321 | 6/2000 |
| KR | 10-2003-0083700 A | 10/2003 |
| KR | 10-2005-0000572 | 1/2005 |
| KR | 10-2008-0018853 A | 2/2008 |

* cited by examiner

*Primary Examiner* — Michael Caley
(74) *Attorney, Agent, or Firm* — McKenna Long & Aldridge, LLP

(57) ABSTRACT

A patterned retardation film includes: a substrate; a first alignment film and a second alignment film disposed on the substrate, processed by different alignment processes and having different alignment directions; and a liquid crystal layer disposed on the first alignment film and the second alignment film, wherein the liquid crystal layer is patterned into a first region, which is aligned by the first alignment film, and a second region, which is aligned by the second alignment film.

38 Claims, 6 Drawing Sheets

PATTERNED RETARDATION FILM AND METHOD FOR MANUFACTURING THE SAME

This application is a Continuation application of International Patent Application No. PCT/KR2010/007055, filed on Oct. 14, 2010, which claims priority to Korean Application Nos. 10-2009-0099358, filed on Oct. 19, 2009 and 10-2010-0099695, filed on Oct. 13, 2010, which are incorporated by reference in their entirety herein.

TECHNICAL FIELD

The present invention relates to a patterned retardation film for use in a 3D image display device, and a method for manufacturing the same, and more particularly, to a patterned retardation film manufactured using two kinds of alignment films for which different alignment processes are performed, and a method for manufacturing the same.

BACKGROUND ART

Contrary to a 2D planar image, a 3D image is similar to a real image a person sees and feels. Thus, a 3D image is a new concept in realistic imaging which improves the level of visual information. A 3D effect is realized through a procedure in which left and right eyes perceive an object with disparity. That is, since a person's two eyes are spaced apart by about 65 mm, they see images in two slightly different directions. At this time, a 3D effect is realized due to the optical phenomenon of binocular disparity. Therefore, a 3D image may be realized by inputting disparate images to an observer's two eyes.

A conventional 3D image display device may be categorized into a 3D image display device using a polarized glasses method and a 3D image display device using a glasses-free method. The 3D image display device using the polarized glasses method realizes a 3D effect by outputting left-eye image and right-eye image having different polarization characteristics through polarizers attached to the polarized glasses so that the left-eye image is projected to a left-eye lens and the right-eye image is projected to a right-eye lens. Such a polarized glasses method is disadvantageous in that an observer must wear the polarized glasses, but is advantageous in that limitations on the viewing angle are relatively small and the manufacturing thereof is easy.

The 3D image display device using the polarized glasses method includes an image display unit and a polarization unit. The image display unit includes a left-eye image display unit and a right-eye image display unit which are alternately disposed to generate a left-eye image and a right-eye image, respectively. The polarization unit changes the polarization states of the left-eye image and the right-eye image generated from the image display unit.

The polarization unit may be manufactured by patterning polarizers corresponding to the left-eye image display unit and the right-eye image display unit, or attaching polarizers to retardation films (optical filters) patterned corresponding to the left-eye image display unit and the right-eye image display unit.

Meanwhile, the patterned polarizer or retardation film may be manufactured by coating a photoresist on a polarizer in which a triacetyl cellulose (TAC) film and an iodized stretched polyvinyl alcohol (PVA) film are laminated, or a retardation film exposing a predetermined portion, and treating the exposed portion with a potassium hydroxide solution so that the phase difference retarding function of the predetermined portion is removed. However, such a conventional method is problematic in that it entails a complicated manufacturing step due to chemical etching, has high manufacturing costs, and has low productivity.

As another method, a patterned optical filter may be manufactured by forming a phase retardation layer on a substrate and removing a portion of the phase retardation layer through a laser or grinder. However, this method is disadvantageous in that precise patterning is difficult and defects easily occur due to damage of the phase retardation layer during laser etching.

Also, the above-described methods are disadvantageous in that it is difficult to form patterns of the polarizer or retardation film in exact correspondence to pixels of the image display unit, and a crosstalk occurrence rate is high due to mismatch between the patterns of the retardation film and the pixels of the image display unit.

In order to solve the above problems, there has been a method which manufactures a patterned optical filter, in which an alignment film and/or liquid crystal materials forming a retardation film are printed on a substrate in specific patterns. More specifically, the patterned optical filter may be manufactured by printing an alignment film on a substrate in specific patterns, performing a rubbing process or a photo-alignment process on the alignment film, and forming a liquid crystal layer on the alignment film. Alternatively, the patterned optical filter may be manufactured by printing an alignment film on an entire surface of a substrate, aligning the alignment film in specific patterns by using a mask, and forming a liquid crystal layer on the alignment film. Alternatively, the patterned optical filter may be manufactured by printing an alignment film on an entire surface of a substrate, aligning the alignment film, and printing a liquid crystal layer in specific patterns. The method for manufacturing the patterned optical filter using the printing process is advantageous in that pixels of the image display unit and patterns of the optical filter may be well matched.

However, the optical filters manufactured by the above-described methods have a structure in which an alignment portion in which the liquid crystal layer is aligned in a specific direction and a non-alignment portion in which the liquid crystal layer is not aligned are alternately arranged. Since the non-alignment portion significantly degrades optical performance as compared with the alignment portion, the use of the optical filters manufactured by the above-described methods degrades the picture quality of the image display device.

DISCLOSURE

Technical Problem

An aspect of the present invention provides a patterned retardation film having a new structure which may be formed at a low cost through a simplified manufacturing process and have excellent process efficiency and optical performance.

Technical Solution

According to an aspect of the present invention, there is provided a patterned retardation film including: a substrate; a first alignment film and a second alignment film disposed on the substrate, processed by different alignment processes and having different alignment directions; and a liquid crystal layer disposed on the first alignment film and the second alignment film, wherein the liquid crystal layer is patterned into a first region, which is aligned by the first alignment film, and a second region, which is aligned by the second alignment film.

The substrate may have an in-plane retardation in the range of 0-30 nm and have an absolute value of a thickness retardation in the range of 0-300 nm.

The substrate may be selected from the group consisting of triacetyl cellulose, polyacrylate, polyethylene terephthalate, polycarbonate, polyethylene, and cycloolefin polymer.

The liquid crystal layer may be patterned in stripe patterns or grid patterns. The alignment direction of the first alignment film and the alignment direction of the second alignment film may be perpendicular to each other. The liquid crystal layer may be a λ/4 phase retardation layer.

The first alignment film may be formed on an entire surface of the substrate, and the second alignment film may be formed on the first alignment film in regular patterns. When the first alignment film is a rubbing alignment film, the second alignment film may be a photo-alignment film. When the first alignment film is a photo-alignment film, the second alignment film may be a rubbing alignment film.

The first alignment film may be formed on a surface of the substrate in regular patterns, and the second alignment film may be formed in a region where the first alignment film is not formed. In this case, when the first alignment film is a rubbing alignment film, the second alignment film may be a photo-alignment film. When the first alignment film is a photo-alignment film, the second alignment film may be a rubbing alignment film.

According to another aspect of the present invention, there is provided a patterned retardation film including: a substrate a surface of which is rubbed in a first alignment direction; a photo-alignment film disposed on the rubbed surface of the substrate in regular patterns, the photo-alignment film being aligned in a second alignment direction; and a liquid crystal layer disposed on the substrate and the photo-alignment film, wherein the liquid crystal layer is patterned into a first region, which is aligned by the rubbed substrate, and a second region, which is aligned by the photo-alignment film.

The substrate may have an in-plane retardation in the range of 0-30 nm and have an absolute value of a thickness retardation in the range of 0-300 nm.

The substrate may be selected from the group consisting of triacetyl cellulose and polyethylene terephthalate.

The liquid crystal layer may be patterned in stripe patterns or grid patterns. The first alignment direction and the second alignment direction may be perpendicular to each other. The liquid crystal layer may be a λ/4 phase retardation layer.

According to another aspect of the present invention, there is provided a method for manufacturing a retardation film, including: coating a first alignment film material on a first substrate; forming a first alignment film by aligning the first alignment film material in a first alignment direction; coating a second alignment film material on the first substrate or the first alignment film; forming a second alignment film by aligning the second alignment film material in a second alignment direction; and forming a patterned liquid crystal layer by coating liquid crystals on the first alignment film and the second alignment film and curing the coated liquid crystals.

The first alignment direction and the second alignment direction may be perpendicular to each other. The first alignment film material and/or the second alignment film material may be coated using a printing process.

The method may further include: preparing a second substrate on which an adhesive layer is formed on a surface thereof; attaching the adhesive layer of the second substrate to the patterned liquid crystal layer on the first substrate; and separating the second substrate from the first substrate to transfer the patterned liquid crystal layer onto the second substrate.

The first alignment film material may be coated on the entire surface of the first substrate, and the second alignment film material may be coated on the first alignment film in regular patterns.

The first alignment film material may be a rubbing alignment film material and may be formed by a rubbing process, and the second alignment film material may be a photo-alignment film material and may be formed by a photo-alignment process.

The first alignment film material may be a photo-alignment film material and may be formed by a photo-alignment process, and the second alignment film material may be a rubbing alignment film material and may be formed by a rubbing process.

The first alignment film material may be coated on the first substrate in regular patterns, and the second alignment film material may be coated on the first substrate in a region where the first alignment film is not formed.

The first alignment film material may be a rubbing alignment film material and may be formed by a rubbing process, and the second alignment film material may be a photo-alignment film material and may be formed by a photo-alignment process.

The first alignment film material may be a photo-alignment film material and may be formed by a photo-alignment process, and the second alignment film material may be a rubbing alignment film material and may be formed by a rubbing process.

The first substrate may have an in-plane retardation in the range of 0-30 nm and have an absolute value of a thickness retardation in the range of 0-300 nm.

The first substrate may be selected from the group consisting of triacetyl cellulose, polyacrylate, polyethylene terephthalate, polycarbonate, polyethylene, and cycloolefin polymer.

The second substrate may be selected from the group consisting of triacetyl cellulose, polyacrylate, polyethylene terephthalate, polycarbonate, polyethylene, and cycloolefin polymer.

According to another aspect of the present invention, there is provided a method for manufacturing a retardation film, including: rubbing a surface of a first substrate in a first alignment direction; coating a photo-alignment film material on the rubbed surface of the first substrate in regular patterns; forming a photo-alignment film by irradiating polarized UV light onto the photo-alignment film material in a second alignment direction; and forming a liquid crystal layer by coating liquid crystals on the rubbed surface of the first substrate and the photo-alignment film and curing the coated liquid crystals.

The first alignment direction and the second alignment direction may be perpendicular to each other.

The photo-alignment film material may be coated in regular patterns by using a printing process.

The method may further include: preparing a second substrate on which an adhesive layer is formed on a surface thereof; attaching the adhesive layer of the second substrate to the patterned liquid crystal layer on the first substrate; and separating the second substrate from the first substrate to transfer the patterned liquid crystal layer onto the second substrate.

The first substrate may be selected from the group consisting of triacetyl cellulose and polyethylene terephthalate.

The second substrate may be selected from the group consisting of triacetyl cellulose, polyacrylate, polyethylene terephthalate, polycarbonate, polyethylene, and cycloolefin polymer.

Advantageous Effects

According to the embodiments of the present invention, since the alignment films processed by different alignment processes are used, the patterned retardation film may be formed by a simple method, without undergoing a multi-step process such as photolithography.

Also, since a printing process is used in coating the alignment films, a critical dimension may be easily adjusted. Hence, the alignment films may be patterned in various shapes. Unlike a laser etching, there is no direct contact, reducing a failure rate and improving process efficiency.

Furthermore, the retardation film according to the embodiment of the present invention may realize excellent optical performance because there is no non-alignment portion in the liquid crystal layer.

Moreover, since only the liquid crystal layer is transferred onto another film, the optical performance of the retardation film may be further improved.

BEST MODE

As the result of the present inventors' continuous research, they confirmed that the use of two kinds of alignment films formed by different processes make it possible to simplify a manufacturing process, reduce a failure rate, and manufacture a patterned retardation film having excellent optical performance.

Hereinafter, a patterned retardation film according to an embodiment of the present invention will be described in a greater detail.

Figure 1:
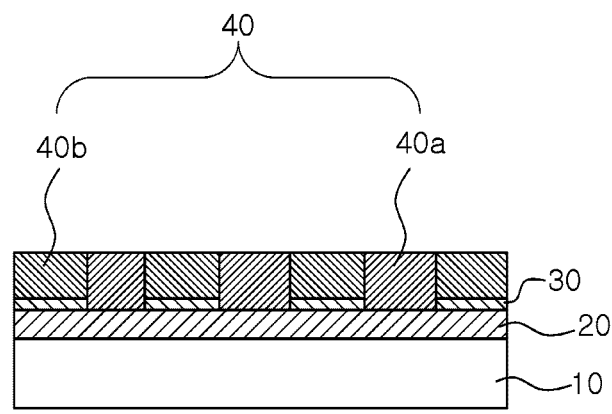
FIG. 1 illustrates a patterned retardation film according to a first embodiment of the present invention.
Figure 3:
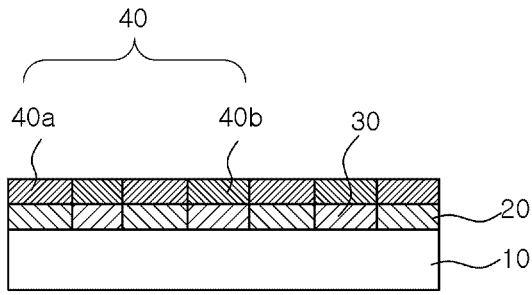
FIG. 3 illustrates a patterned retardation film according to a second embodiment of the present invention.

FIGS. 1 and 3 illustrate patterned retardation films according to embodiments of the present invention.

As illustrated in FIGS. 1 and 3, retardation films according to embodiments of the present invention include a substrate 10, a first alignment film 20, a second alignment film 30, and a liquid crystal layer 40. The first alignment film 20 and the second alignment film 30 are formed by different alignment processes so that they have different alignment directions. The liquid crystal layer 40 is patterned into a first region 40a, which is aligned by the first alignment film 20, and a second region 40b, which is aligned by the second alignment film 30.

Well-known substrates, for example, plastic substrates, may be used as the substrate 10. Examples of the substrate 10 may include, but are not limited to, substrates made of tri-acetyl cellulose, polyacrylate, polyethylene terephthalate, polycarbonate, polyethylene, or cycloolefin polymer such as norbornene derivatives.

The substrate 10 may be an isotropic substrate having little in-plane retardation and thickness direction retardation, or it has only a thickness direction retardation, without in-plane retardation. More specifically, the substrate 10 may have an in-plane retardation (Rin) in the range of 0-30 nm, preferably 0-20 nm, and more preferably 0-10 nm, and have an absolute value of a thickness direction retardation (Rth) in the range of 0-300 nm, preferably 0-200 nm, and more preferably 0-100 nm.

In this case, the in-plane retardation (Rin) and the thickness direction retardation (Rth) are defined as Equations (1) and (2) below.

$$Rin=(n_x-n_y) \times d \tag{1}$$

$$Rth=(n_z-n_x) \times d \tag{2}$$

In Equations (1) and (2) above, $n_x$ represents a refractive index in a direction having the greatest refractive index within the in-plane of the film, $n_y$ represents a refractive index in a direction perpendicular to $n_x$, and $n_z$ represents a refractive index in a thickness direction.

The thickness of the substrate 10 is not specifically limited. In general, the thickness of the substrate 10 is in the range of 30-100 μm.

The first alignment film 20 and the second alignment film 30 are formed by different alignment processes and have different alignment directions.

For example, when the first alignment film 20 is a photo-alignment film, a rubbing alignment film may be used as the second alignment film 30. When the first alignment film 20 is a rubbing alignment film, a photo-alignment film may be used as the second alignment film. As such, when the differently processed alignment films are used, the process for one of the alignment films does not affect the other. Thus, alignment films having different alignment directions may be easily formed, without undergoing a complicated process such as a mask or photoresist process. For example, even though UV polarized light is irradiated onto the rubbing alignment film, the alignment direction of the alignment film does not change. Also, in the case in which a rubbing process is performed on the photo-alignment, the alignment direction does not change. Therefore, after coating a rubbing alignment film, a rubbing process is performed in a first alignment direction to form a rubbing alignment film. A polymer film for a photo-alignment film is coated on the rubbing alignment film at regular intervals. Then, UV polarized light, which is polarized in a second alignment direction different from the first alignment direction, is irradiated onto the polymer film. In this manner, the first alignment film 20 and the second alignment film 30 having different alignment directions are formed.

Also, the alignment directions of the first alignment film 20 and the second alignment film 30 may be perpendicular to each other.

The liquid crystal layer 40 is formed on the first alignment film 20 and the second alignment film 30. The liquid crystal layer 40 is patterned into the first region 40a, which is aligned by the first alignment film 20, and the second region 40b, which is aligned by the second alignment film 30. When liquid crystals are coated on the alignment films, they are aligned in the alignment directions of the alignment films. In this embodiment, as described above, the first alignment film 20 and the second alignment film 30 have different alignment directions. Hence, when the liquid crystal layer 40 is formed on the first alignment film 20 and the second alignment film 30, the liquid crystal layers 40 aligned in different directions are alternately formed to thereby obtain a patterned retardation film.

Figure 8:
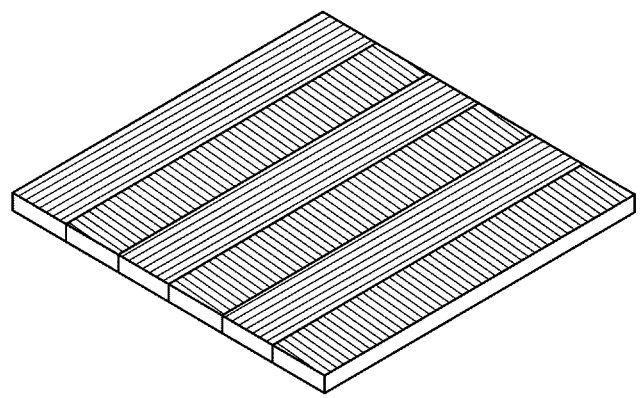
FIG. 8 illustrates a retardation film patterned in a stripe shape.
Figure 9:
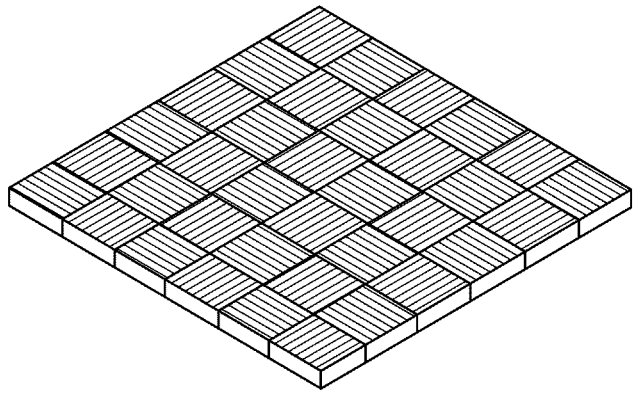
FIG. 9 illustrates a retardation film patterned in a grid shape.

At this time, patterns of the liquid crystal layer 40 are determined by the coated patterns of the second alignment film 30. In the case in which the second alignment film 30 is coated in a stripe shape, a stripe-patterned liquid crystal layer is formed as illustrated in FIG. 8. In the case in which the second alignment film 30 is coated in a grid shape, a grid-patterned liquid crystal layer is formed as illustrated in FIG. 9.

Meanwhile, the liquid crystal layer 40 may have various phase differences, depending on its thickness. The liquid crystal layer 40 may be a λ/4 phase retardation layer. In the case in which the liquid crystal layer 40 is the λ/4 phase retardation layer, it serves to change linearly polarized light to circularly polarized light, and change circularly polarized light to linearly polarized light. This function may be useful for a 3D image display device.

Meanwhile, as illustrated in FIG. 1, the retardation film according to the embodiment of the present invention may be manufactured such that the first alignment film 20 is formed on an entire surface of the substrate 10, and the second alignment film 30 is formed on the first alignment film 20 in regular patterns. Alternatively, as illustrated in FIG. 3, the first alignment film 20 and the second alignment film 30 may be alternately formed on the substrate 10. That is, the first alignment film 20 may be formed on a surface of the substrate 10 in regular patterns, and the second alignment film 30 may be formed in regions where the first alignment film 20 is not formed.

Figure 2:
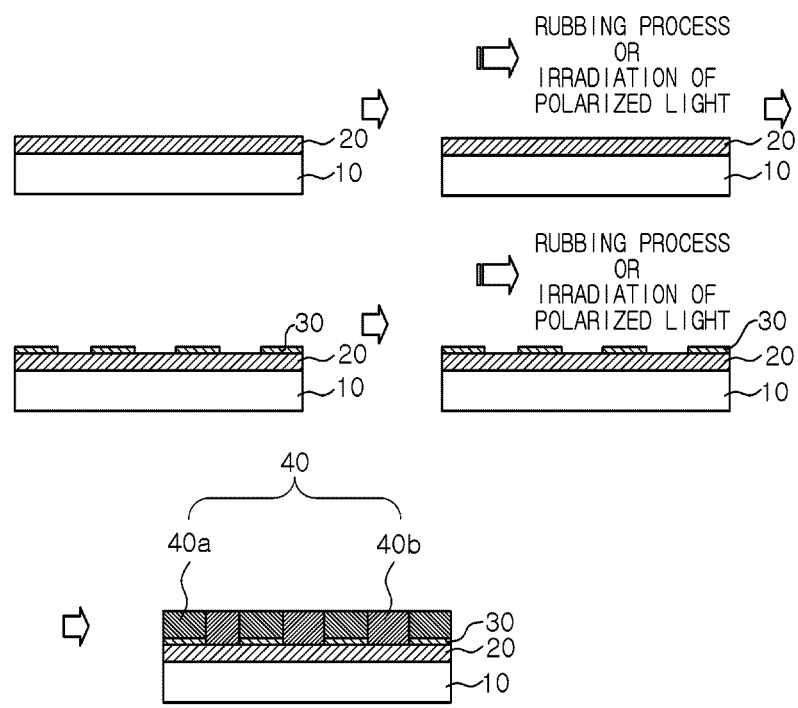
FIG. 2 illustrates a method for manufacturing the retardation film of FIG. 1 according to the embodiment of the present invention.
Figure 4:
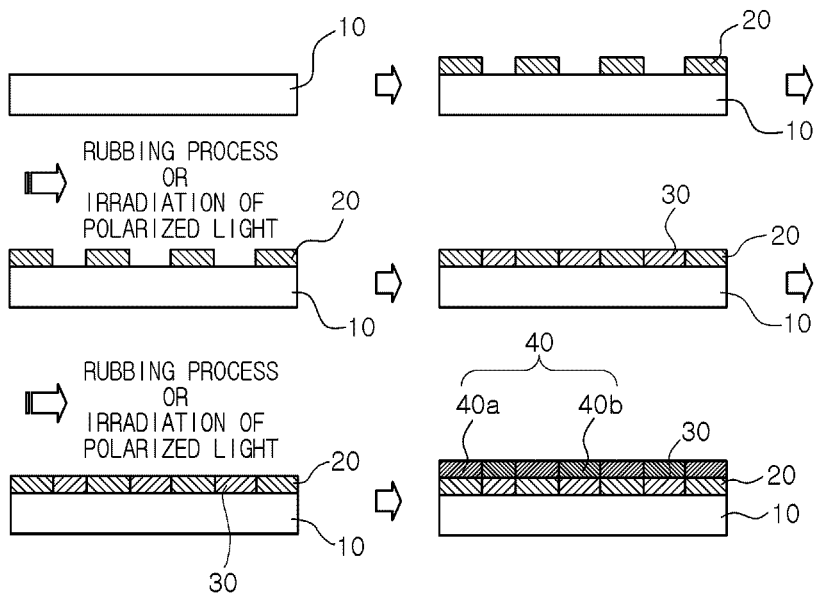
FIG. 4 illustrates a method for manufacturing the retardation film of FIG. 3 according to the embodiment of the present invention.

FIG. 2 illustrates a method for manufacturing the retardation film of FIG. 1, and FIG. 4 illustrates a method for manufacturing the retardation film of FIG. 3. As illustrated in FIGS. 2 and 4, the method for manufacturing the retardation film according to the embodiment of the present invention may include coating a first alignment film material, forming a first alignment film, coating a second alignment film material, forming a second alignment film, and forming a liquid crystal layer.

The first alignment film material may be coated on an entire surface of the first substrate 10 as illustrated in FIG. 2, or may be coated on a surface of the first substrate 10 in regular patterns as illustrated in FIG. 4.

First, the case in which the first alignment film material is coated on the entire surface of the first substrate 10 will be described with reference to FIG. 2. A first alignment film material is coated on an entire surface of a first substrate 10. The first alignment film material may be a rubbing alignment film material or a photo-alignment film material.

The first alignment film material coated on the entire surface of the first substrate 10 is aligned to form a first alignment film 20. At this time, an appropriate aligning process may be used according to the first alignment film material used herein. For example, when the first alignment film material is a rubbing alignment film material, the first alignment film 20 is formed by a rubbing alignment process. That is, the first alignment film 20 is formed by coating a rubbing alignment film material and rubbing the coated rubbing alignment film material with a rubbing cloth in a specific direction (a first alignment direction). When the first alignment film material is a photo-alignment film material, the first alignment film 20 is formed by a photo-alignment process. That is, the first alignment film 20 is formed by coating a photo-alignment film material and irradiating polarized UV light thereupon in a specific direction (a first alignment direction).

After forming the first alignment film 20 in the above-described manner, a second alignment film material is coated on the first alignment film 20. At this time, the second alignment film material is not coated on the entire surface of the first alignment film 20, but coated in regular patterns. For example, the second alignment film material may be coated in stripe patterns or grid patterns disposed at regular intervals. When the second alignment film material is selectively coated on the first alignment film in regular patterns, the first alignment film 20 and the second alignment film 30 are alternately formed on the first substrate 10.

Meanwhile, the first alignment film material and/or the second alignment film material may be coated by a printing process. The case of coating the alignment film material by the printing process has an advantage in that necessary materials may be coated only at desired positions, without undergoing a complicated process such as a mask or photoresist process. Also, since materials are not unnecessarily wasted, manufacturing costs are reduced and critical dimension (CD) of patterns to be formed may be easily adjusted through change of print patterns.

The second alignment film material is aligned differently from the first alignment film material. That is, when the first alignment film material is a photo-alignment film material, a burring alignment film material is used as the second alignment film material. When the first alignment film material is a rubbing alignment film material, a photo-alignment film material is used as the second alignment film material.

The second alignment film 30 is formed by an appropriate method according to the second alignment film material. That is, when the second alignment film material is a rubbing alignment film material, the second alignment film 30 is formed by a rubbing alignment process. That is, the second alignment film 30 is formed by coating the material and rubbing the coated material with a rubbing cloth in a specific direction (a second alignment direction). When the second alignment film material is a photo-alignment film material, the second alignment film 30 is formed by a photo-alignment process. That is, the second alignment film 30 is formed by coating the material and irradiating polarized UV light thereupon in a specific direction (a second alignment direction).

At this time, the alignment direction of the second alignment film is different from that of the first alignment film. The alignment direction of the second alignment film may be perpendicular to that of the first alignment film. As described above, since the first alignment film and the second alignment film are formed by different alignment processes, the second alignment film is processed without influence, even though the first alignment film is exposed to the surface of the substrate. Therefore, after forming the second alignment film, the first alignment film aligned in the first alignment direction and the second alignment film aligned in the second alignment direction are alternately formed on the surface of the substrate.

Then, reactive liquid crystals are coated on the first alignment film 20 and the second alignment film 30 alternately formed, and are then crosslinked by heat or light to form the liquid crystal layer 40. The reactive liquid crystals refer to a material which forms a liquid polymer through polymerization of adjacent liquid monomers by light or heat. The reactive liquid crystals may be formed of one or more kinds of materials to which an acrylate group causing the polymerization of the reactive liquid monomers are attached. Representative examples of the reactive liquid crystals may include Reactive Mesogen (RM) of Merk or LC242 of BASF.

As described above, when the reactive liquid crystals coated on the first alignment film 20 and the second alignment film 30 are cured, a patterned liquid crystal layer 40 is obtained. The patterned liquid crystal layer 40 is aligned in different directions by the alignment films disposed therebelow.

Next, as illustrated in FIG. 4, the case in which the first alignment film material is coated on a surface of the first substrate 10 in regular patterns will be described.

First, a first alignment film material is coated on a surface of a first substrate 10 in regular patterns, for example, stripe patterns or grid patterns disposed at regular intervals. The first alignment film material may be a rubbing alignment film material or a photo-alignment film material. The first alignment film material may be coated through a printing process, but the invention is not limited thereto.

Then, a first alignment film 20 is formed by an appropriate aligning process according to the first alignment film material. For example, when the first alignment film material is a rubbing alignment film material, the first alignment film 20 is formed by a rubbing alignment process. That is, the first alignment film 20 is formed by rubbing the rubbing alignment film material with a rubbing cloth in a specific direction (a first alignment direction). When the first alignment film material is a photo-alignment film material, the first alignment film 20 is formed by a photo-alignment process. That is, the first alignment film 20 is formed by irradiating polarized UV light onto the photo-alignment film material in a specific direction (a first alignment direction).

After forming the first alignment film 20 in the above-described manner, a second alignment film material is selectively coated in regions where the first alignment films are not formed. A second alignment film 30 is formed by an appropriate aligning process according to the second alignment film material.

The second alignment film material is aligned differently from the first alignment film material. For example, when the first alignment film material is a rubbing alignment film material, a photo-alignment film material may be used as the second alignment film material. When the first alignment film material is a photo-alignment film material, a rubbing alignment film material may be used as the second alignment film material. Since details regarding the alignment methods and alignment directions of the alignment film materials are substantially the same as those of FIG. 2, further descriptions thereof will be omitted.

Also, the second alignment film material may be coated through a printing process, but the invention is not limited thereto.

When the first alignment film 20 and the second alignment film 30 are formed in the above-described manner, the first alignment film 20 and the second alignment film 30 are alternately arranged as illustrated in FIG. 4. Reactive liquid crystals are coated on the first alignment film 20 and the second alignment film 30 alternately arranged, and they are crosslinked by heat or light to form a liquid crystal layer 40. Since the kind of the liquid crystal material and a forming method thereof are identical to those described above, a detailed description thereof will be omitted.

Figure 5:
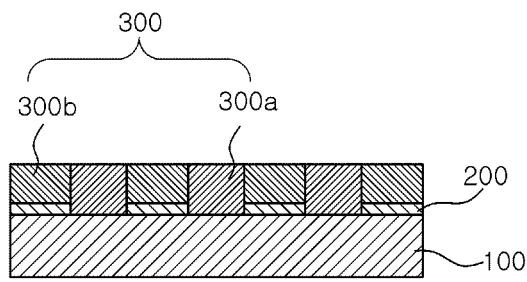
FIG. 5 illustrates a patterned retardation film according to a third embodiment of the present invention.

FIG. 5 illustrates a patterned retardation film according to another embodiment of the present invention. As illustrated in FIG. 5, the retardation film according to the embodiment of the present invention may include a rubbing-processed substrate 100, a photo-alignment film 200, and a liquid crystal layer 300. The photo-alignment film 200 and the liquid crystal layer 300 are selectively formed on the substrate 100 in regular patterns. When a rubbing-processable substrate is used, a single alignment film has only to be formed. In this regard, the patterned retardation film may be easily manufactured by a simpler method.

The rubbing-processed substrate 100 may have the in-plane retardation (Rin) in the range of 0-30 nm, preferably 0-20 nm, and more preferably 0-10 nm, and have the absolute value of the thickness direction retardation (Rth) in the range of 0-300 nm, preferably 0-200 nm, and more preferably 0-100 nm. Examples of the rubbing-processable substrate 100 may include substrates made of triacetyl cellulose, polyethylene terephthalate, or the like. When such a substrate is used, a rubbing process may be performed by rubbing the surface of the substrate 100 with a rubbing cloth in a specific direction (a first alignment direction). When such a rubbing process is undergone, liquid crystals coated on the substrate 100 are aligned in the rubbing direction.

Then, a photo-alignment film 200 processed in a second alignment direction different from the first alignment direction is formed on the rubbing-processed substrate 100. At this time, the photo-alignment film is not formed on the entire surface of the substrate 100, but selectively formed in regular patterns. Also, the first alignment direction and the second alignment direction may be perpendicular to each other.

When the photo-alignment film 200 is selectively formed on the rubbing-processed substrate 100, the rubbing-processed substrate 100 having the first alignment direction and the photo-alignment film 200 having the second alignment direction are alternately exposed. As illustrated in FIG. 5, when liquid crystals are coated on the substrate 100 and the photo-alignment film 200, patterned liquid crystal layers 300a and 300b may be formed. The patterned liquid crystal layers 300a and 300b include a first region 300a aligned in the first alignment direction and a second region 300b aligned in the second alignment direction are formed.

Figure 6:
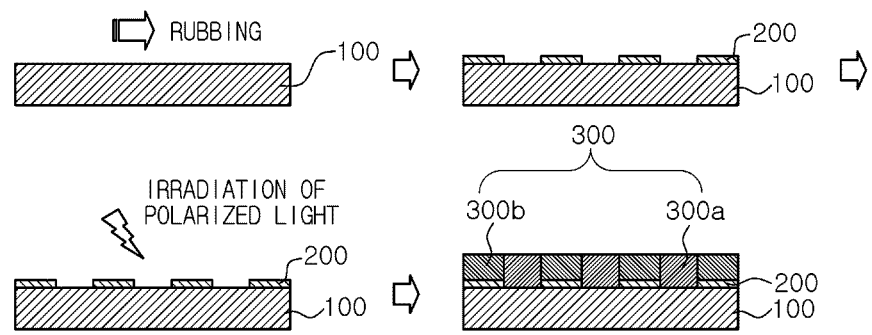
FIG. 6 illustrates a method for manufacturing the retardation film of FIG. 5 according to the embodiment of the present invention.

FIG. 6 illustrates a method for manufacturing the retardation film of FIG. 5 according to an embodiment of the present invention. As illustrated in FIG. 6, the method for manufacturing the retardation film may include rubbing a substrate, coating a photo-alignment film, forming a photo-alignment film, and forming a liquid crystal layer.

First, a surface of a substrate 100 is rubbed with a rubbing cloth in a specific direction (a first alignment direction). When the rubbing of the substrate 100 is completed, a photo-alignment film material is coated on the substrate 100. At this time, the photo-alignment film material is not coated on the entire surface of the substrate 100, but selectively coated in regular patterns. For example, the photo-alignment film material may be coated in stripe patterns or grid patterns disposed at regular intervals by a printing process.

Then, a photo-alignment film 200 is formed by irradiating polarized UV light on the photo-alignment film material in a specific direction (a second alignment direction).

At this time, the alignment direction (the second alignment direction) of the photo-alignment film 200 is different from the rubbing direction (the first alignment direction) of the surface of the substrate 100. The alignment direction and the rubbing direction may be perpendicular to each other. Since the photo-alignment film 200 is formed not entirely but selectively at regular intervals, the rubbed portion and the photo-alignment film portion are alternately formed on the surface of the substrate 100.

Then, reactive liquid crystals are coated on the substrate 100 and the photo-alignment film 200 and are crosslinked by heat or light to form a liquid crystal layer 300. Since the kinds of the liquid crystals and the forming method thereof are substantially the same as described above, further description thereof will be omitted.

Figure 7:
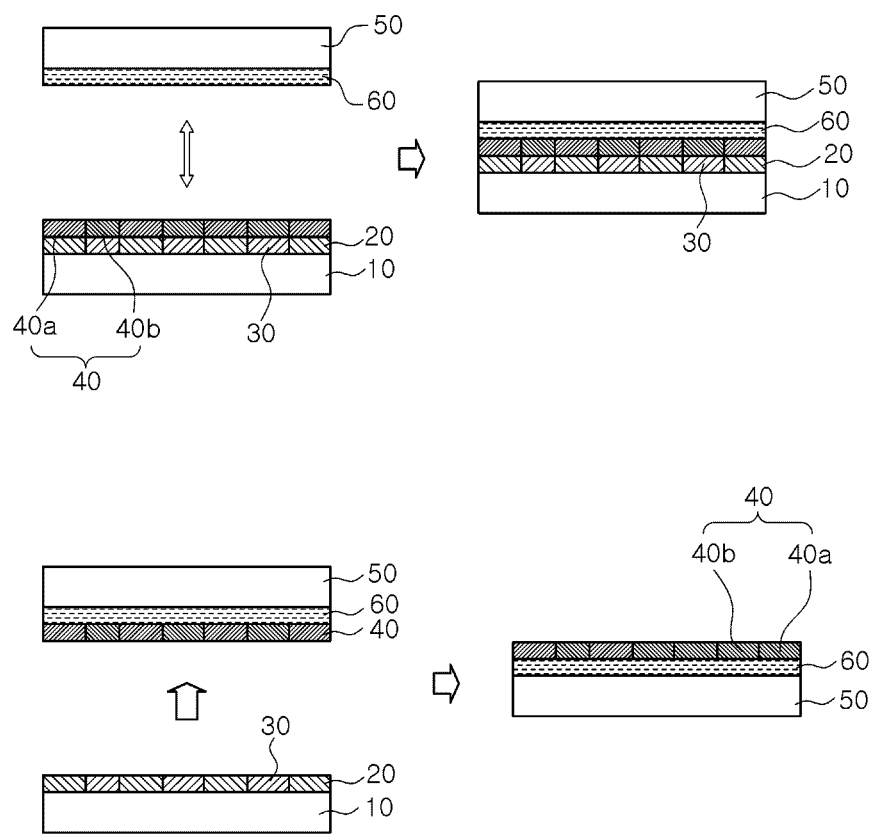
FIG. 7 illustrates a method for transferring a patterned liquid crystal layer onto another film.

FIG. 7 illustrates a method for manufacturing a retardation film according to another embodiment of the present invention. The manufacturing method of FIG. 7 may further include transferring only the patterned liquid crystal layer onto another film after the patterned retardation film is manufactured by the methods of FIGS. 2, 4 and 6.

More specifically, a first substrate in which a liquid crystal layer is patterned is manufactured by using the above-described method for manufacturing the patterned retardation film. A second substrate on which an adhesive layer is formed on a surface thereof is separately prepared. The adhesive layer on the second substrate is attached to the patterned liquid crystal layer on the first substrate. The second substrate and the first substrate are separated from each other to transfer the patterned liquid crystal layer onto the second substrate.

The case in which the retardation film of FIG. 3 having the first alignment film 10 and the second alignment film 20 alternately formed is used as the first substrate is illustrated in FIG. 7. However, this case is merely exemplary, and the invention is not limited thereto. That is, the retardation film of FIG. 1 or the retardation film of FIG. 5 may be used as the first substrate. Since the method for manufacturing the first substrate is substantially the same as the above-described method for manufacturing the patterned retardation film, detailed description thereof will be omitted.

Meanwhile, the second substrate 50 on which the adhesive layer 60 is formed may be prepared by coating an adhesive resin on a plastic substrate or attaching an adhesive sheet thereto. Examples of the plastic substrate may be substrates made of triacetyl cellulose, polyacrylate, polyethylene terephthalate, polycarbonate, polyethylene, or cycloolefin polymer such as norbornene derivatives. After the second substrate 50 in which the adhesive layer 60 is formed is prepared, the adhesive layer 60 of the second substrate 50 is attached to the liquid crystal layer 40 of the first substrate 10. Then, the first substrate 10 is separated from the second substrate 50 to transfer the patterned liquid crystal layer 40 onto the adhesive layer 60 of the second substrate 50.

In the retardation film, the liquid crystal layer serves to cause the retardation, but the other components, that is, the substrates or the alignment films, do not optically perform a role. Rather, when such substrates or alignment films are more than a predetermined thickness or have a phase difference, they may degrade the performance of the retardation film. Therefore, after manufacturing the retardation film through the processes of FIGS. 2, 4 and 6, only the patterned liquid crystal layer is transferred onto another film. In this manner, the retardation film having optically accurate and excellent performance may be manufactured.

Figure 12:
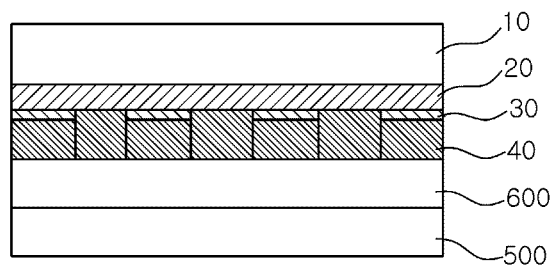
FIG. 12 illustrates a polarizer including the patterned retardation film according to the first embodiment of the present invention.
Figure 13:
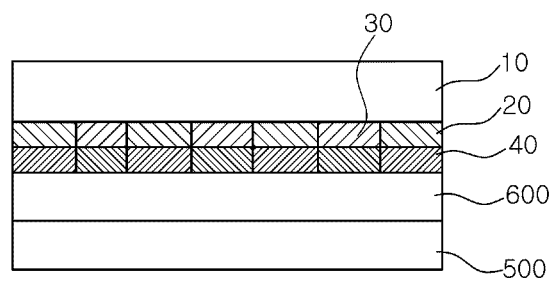
FIG. 13 illustrates a polarizer including the patterned retardation film according to the second embodiment of the present invention.
Figure 14:
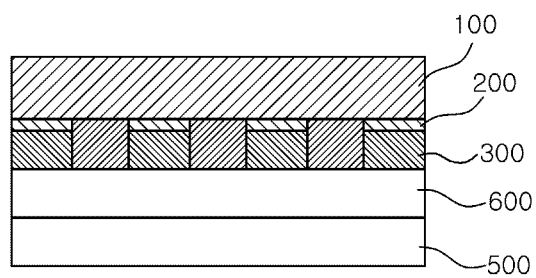
FIG. 14 illustrates a polarizer including the patterned retardation film according to the third embodiment of the present invention.

The retardation film manufactured by the above-described method may be usefully used as an optical filter by attaching it to a polarizer. FIGS. 12 to 14 illustrate various implementation examples of the polarizer to which the patterned retardation film according to the embodiment is attached. As illustrated in FIGS. 12 to 14, the patterned retardation film according to the embodiment of the present invention is disposed such that the liquid crystal layers 40 and 300 face the polarizer 500.

However, the invention is not limited thereto. If necessary, the adhesive layer 600 may be disposed between the polarizer 500 and the liquid crystal layers 40 and 300.

The polarizer including the retardation film according to the embodiment of the present invention may be usefully used in a 3D image display device.

[Mode for Invention]

Hereinafter, the present invention will be described in a greater detail with reference to specific embodiments.

Polyvinyl alcohol, tris[2-(acryloyloxy)ethyl]isocyanurate and pentaerythritol triacrylate as a polyfunctional monomer, and Irgacure 2050 as a photoinitiator were dissolved in a mixture solvent, in which water and ethyl alcohol were mixed at a weight ratio of 50:50, at a concentration of 2 wt %, 0.7 wt %, 0.3 wt %, and 0.25 wt %, respectively, to thereby prepare a rubbing alignment film material.

The rubbing alignment film material was coated with a wire bar on a triacetyl cellulose (TAC) substrate such that a dry film thickness (DFT) thereof became about 0.1 μnm. The rubbing alignment film material was dried by blowing hot air within a 100° C. drying oven for 2 minutes, and was cured by irradiating UV light one time at a rate of 3 m/min by using an 80 W/cm high-pressure mercury lamp. The cured alignment film is rubbed to form the first alignment film.

Then, 5-nobornene-2-methyl-(4-methoxycinnamate) as a photoreactive polymer, dipentaerythritol hexaacrylate as a polyfunctional monomer, and Igacure 907 (Swiss, Ciba-Geigy) as a photoinitiator were dissolved in cyclopentanone at a concentration of 2 wt %, 2 wt %, and 0.5 wt %, respectively, to thereby prepare a photo-alignment film material.

The photo-alignment film material was printed in stripe patterns at intervals of 300 nm such that a dry film thickness thereof became about 0.1 μm, and was dried by blowing hot air within a 70° C. drying oven for 2 minutes.

Then, an 80 W/cm high-pressure mercury lamp was used as a light source, and polarized UV light was irradiated by using a wire grid polarizer manufactured by Moxtek. The photo-alignment film was exposed one time at a rate of 3 m/min to thereby form a second alignment film aligned vertically to the alignment direction of the first alignment film.

A polymerizable liquid crystal was prepared by dissolving 25 wt % of a solid content including 95 wt % of LC242 of BASF, which is an in-plane alignable polymerizable liquid crystal compound, and 5 wt % of Igacure 907 (Swiss, Ciba-Geigy), which is a photoinitiator.

The prepared polymerizable liquid crystals were coated on the first alignment film and the second alignment film such that a dry film thickness became about 1 μm, and were dried within a 80° C. drying oven for 2 minutes. Then, the coated liquid crystals were cured by using an 80 W/cm high-pressure mercury lamp to irradiate UV light one time at a rate of 3 m/min to thereby manufacture a retardation film.

Figure 10:
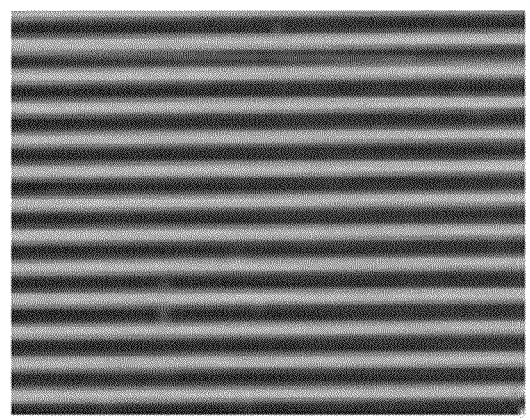
FIG. 10 is a polarizing microscope image showing the patterned retardation film manufactured by the method according to the embodiment of the present invention.
Figure 11:
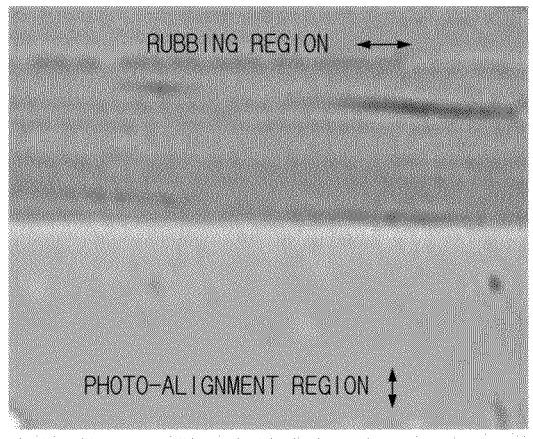
FIG. 11 is an image showing a boundary region between a first alignment film and a second alignment film in the retardation film manufactured by the method according to the embodiment of the present invention.

A polarizing microscope image of the patterned retardation film manufactured by the method according to the embodiment of the present invention is illustrated in FIG. 10, and a magnified image of a boundary region between the first alignment film and the second alignment film in the embodiment of the present invention is illustrated in FIG. 11.

While the present invention has been shown and described in connection with the exemplary embodiments, it will be apparent to those skilled in the art that modifications and variations can be made without departing from the spirit and scope of the invention as defined by the appended claims.

The invention claimed is:

1. A patterned retardation film comprising:
    a substrate;
    a first alignment film and a second alignment film disposed on the substrate, processed by different alignment processes and having different alignment directions; and
    a liquid crystal layer disposed on the first alignment film and the second alignment film,
    wherein the liquid crystal layer is patterned into a first region, which is aligned by the first alignment film, and a second region, which is aligned by the second alignment film, and
    wherein one of the first and second alignment films is a rubbing alignment film, of which an alignment direction is not changed by an irradiation of ultraviolet polarized light, and the other of the first and second alignment films is a photo-alignment film, which is aligned by an irradiation of ultraviolet polarized light and of which an alignment direction is not changed by a rubbing process for aligning the rubbing alignment film.

2. The patterned retardation film of claim 1, wherein the substrate has an in-plane retardation in the range of 0-30 nm and has an absolute value of a thickness retardation in the range of 0-300 nm.

3. The patterned retardation film of claim 1, wherein the substrate is selected from the group consisting of triacetyl cellulose, polyacrylate, polyethylene terephthalate, polycarbonate, polyethylene, and cycloolefin polymer.

4. The patterned retardation film of claim 1, wherein the liquid crystal layer is patterned in stripe patterns or grid patterns.

5. The patterned retardation film of claim 1, wherein the alignment direction of the first alignment film and the alignment direction of the second alignment film are perpendicular to each other.

6. The patterned retardation film of claim 1, wherein the liquid crystal layer is a $\lambda/4$ phase retardation layer.

7. The patterned retardation film of claim 1, wherein the first alignment film is formed on an entire surface of the substrate, and the second alignment film is formed on the first alignment film in regular patterns.

8. The patterned retardation film of claim 7, wherein the first alignment film is the rubbing alignment film, and the second alignment film is the photo-alignment film.

9. The patterned retardation film of claim 7, wherein the first alignment film is the photo-alignment film, and the second alignment film is the rubbing alignment film.

10. The patterned retardation film of claim 1, wherein the first alignment film is formed on a surface of the substrate in regular patterns, and the second alignment film is formed in a region where the first alignment film is not formed.

11. The patterned retardation film of claim 10, wherein the first alignment film is the rubbing alignment film, and the second alignment film is the photo-alignment film.

12. The patterned retardation film of claim 10, wherein the first alignment film is the photo-alignment film, and the second alignment film is the rubbing alignment film.

13. A patterned retardation film comprising:
    a substrate a surface of which is rubbed in a first alignment direction;
    a photo-alignment film disposed on the rubbed surface of the substrate in regular patterns, the photo-alignment film being aligned in a second alignment direction; and
    a liquid crystal layer disposed on the substrate and the photo-alignment film,
    wherein the liquid crystal layer is patterned into a first region, which is aligned by the rubbed substrate, and a second region, which is aligned by the photo-alignment film, and
    wherein the photo-alignment film is an alignment film aligned by an irradiation of ultraviolet polarized light.

14. The patterned retardation film of claim 13, wherein the substrate has an in-plane retardation in the range of 0-30 nm and has an absolute value of a thickness retardation in the range of 0-300 nm.

15. The patterned retardation film of claim 13, wherein the substrate is selected from the group consisting of triacetyl cellulose and polyethylene terephthalate.

16. The patterned retardation film of claim 13, wherein the liquid crystal layer is patterned in stripe patterns or grid patterns.

17. The patterned retardation film of claim 13, wherein the first alignment direction and the second alignment direction are perpendicular to each other.

18. The patterned retardation film of claim 13, wherein the liquid crystal layer is a $\lambda/4$ phase retardation layer.

19. A polarizer comprising the patterned retardation film of claim 1 or 13.

20. A 3D image display device comprising the polarizer of claim 19.

21. A method for manufacturing a retardation film, comprising:
    coating a first alignment film material on a first substrate;
    forming a first alignment film by aligning the first alignment film material in a first alignment direction;
    coating a second alignment film material on the first substrate or the first alignment film;
    forming a second alignment film by aligning the second alignment film material in a second alignment direction; and
    forming a patterned liquid crystal layer by coating liquid crystals on the first alignment film and the second alignment film and curing the coated liquid crystals,
    wherein one of the first and second alignment films is a rubbing alignment film, of which an alignment direction is not changed by an irradiation of ultraviolet polarized light, and the other of the first and second alignment films is a photo-alignment film, which is aligned by an irradiation of ultraviolet polarized light and of which an alignment direction is not changed by a rubbing process for aligning the rubbing alignment film.

22. The method of claim 21, wherein the first alignment direction and the second alignment direction are perpendicular to each other.

23. The method of claim 21, wherein the first alignment film material and/or the second alignment film material are/is coated using a printing process.

24. The method of claim 21, further comprising:
    preparing a second substrate on which an adhesive layer is formed on a surface thereof;
    attaching the adhesive layer of the second substrate to the patterned liquid crystal layer on the first substrate; and
    separating the second substrate from the first substrate to transfer the patterned liquid crystal layer onto the second substrate.

25. The method of claim 21, wherein the first alignment film material is coated on an entire surface of the first substrate, and the second alignment film material is coated on the first alignment film in regular patterns.

26. The method of claim 25, wherein the first alignment film material is the rubbing alignment film material and is formed by a rubbing process, and the second alignment film material is the photo-alignment film material and is formed by a photo-alignment process without using a mask.

27. The method of claim 25, wherein the first alignment film material is the photo-alignment film material and is formed by a photo-alignment process without using a mask, and the second alignment film material is the rubbing alignment film material and is formed by a rubbing process.

28. The method of claim 21, wherein the first alignment film material is coated on the first substrate in regular patterns, and the second alignment film material is coated on the first substrate in a region where the first alignment film is not formed.

29. The method of claim 28, wherein the first alignment film material is a rubbing alignment film material and is formed by a rubbing process, and the second alignment film material is a photo-alignment film material and is formed by a photo-alignment process without using a mask.

30. The method of claim 28, wherein the first alignment film material is a photo-alignment film material and is formed by a photo-alignment process without using a mask, and the second alignment film material is a rubbing alignment film material and is formed by a rubbing process.

31. The method of claim 21, wherein the first substrate has an in-plane retardation in the range of 0-30 nm and has an absolute value of a thickness retardation in the range of 0-300 nm.

32. The method of claim 21, wherein the first substrate is selected from the group consisting of triacetyl cellulose, polyacrylate, polyethylene terephthalate, polycarbonate, polyethylene, and cycloolefin polymer.

33. A method for manufacturing a retardation film, comprising:
    rubbing a surface of a first substrate in a first alignment direction;
    coating a photo-alignment film material on the rubbed surface of the first substrate in regular patterns;
    forming a photo-alignment film by irradiating polarized UV light onto the photo-alignment film material in a second alignment direction; and
    forming a liquid crystal layer by coating liquid crystals on the rubbed surface of the first substrate and the photo-alignment film and curing the coated liquid crystals.

34. The method of claim 33, wherein the first alignment direction and the second alignment direction are perpendicular to each other.

35. The method of claim 33, wherein the photo-alignment film material is coated in regular patterns by using a printing process.

36. The method of claim 33, further comprising:
    preparing a second substrate on which an adhesive layer is formed on a surface thereof;
    attaching the adhesive layer of the second substrate to the patterned liquid crystal layer on the first substrate; and
    separating the second substrate from the first substrate to transfer the patterned liquid crystal layer onto the second substrate.

37. The method of claim 33, wherein the first substrate is selected from the group consisting of triacetyl cellulose and polyethylene terephthalate.

38. The method of claim 24 or 36, wherein the second substrate is selected from the group consisting of triacetyl cellulose, polyacrylate, polyethylene terephthalate, polycarbonate, polyethylene, and cycloolefin polymer.

* * * * *